May 7, 1946.  H. C. RONES  2,399,706
MANUFACTURE OF LENSES FOR EYEGLASSES
Filed Dec. 9, 1943  2 Sheets-Sheet 1
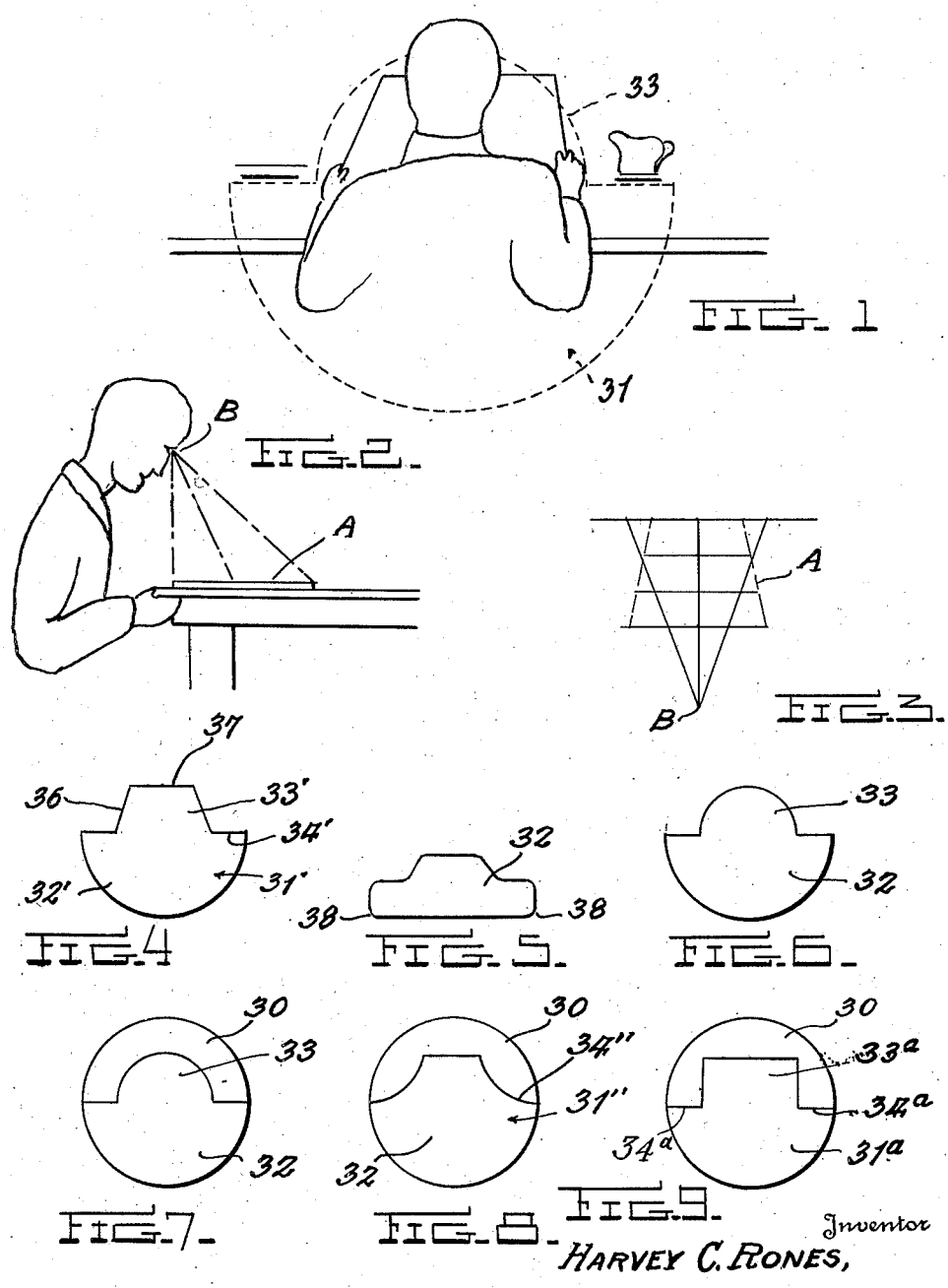
Inventor
HARVEY C. RONES,
By Christian R. Nielsen
Attorney May 7, 1946.  H. C. RONES  2,399,706
MANUFACTURE OF LENSES FOR EYEGLASSES
Filed Dec. 9, 1943   2 Sheets-Sheet 2
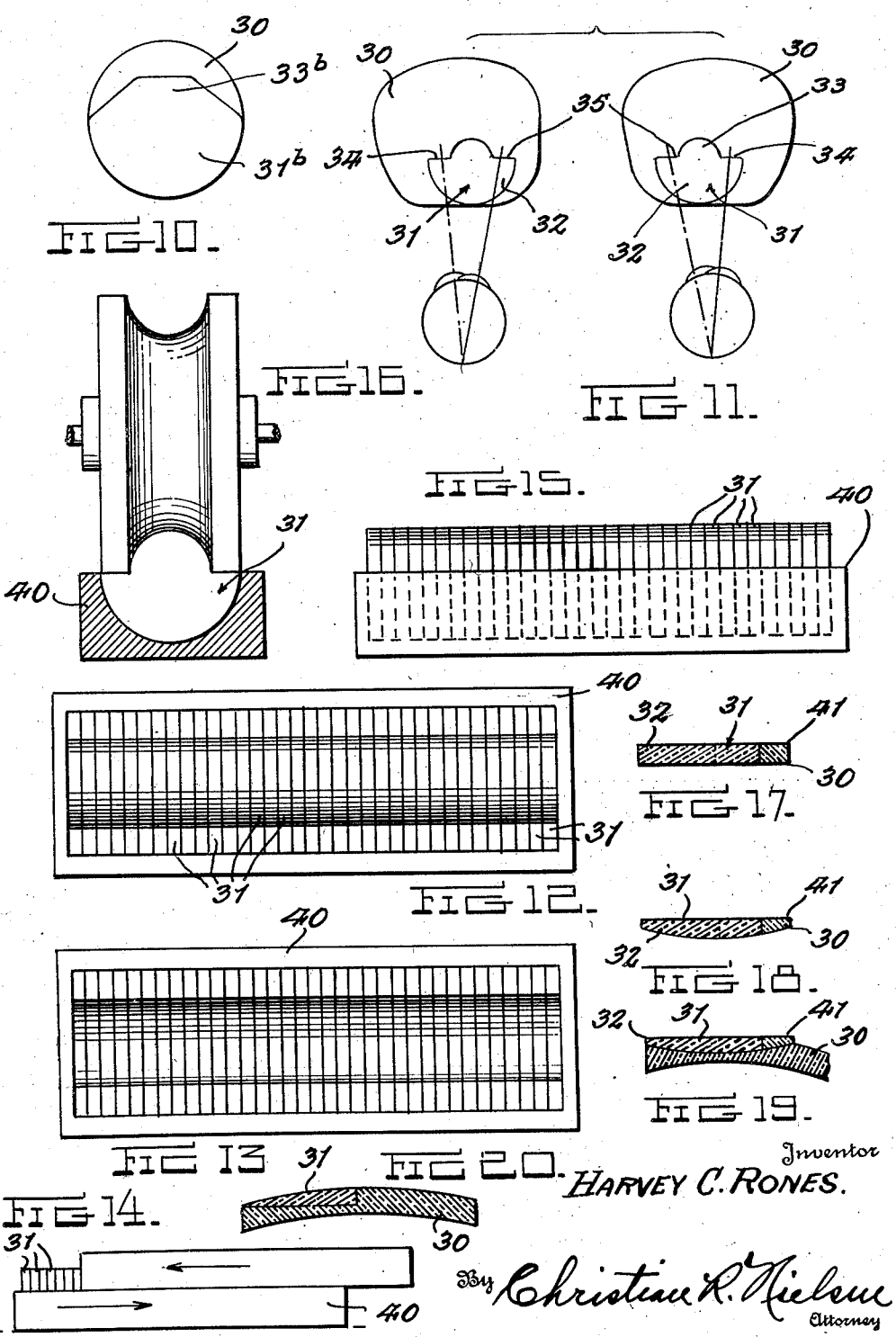
Inventor
HARVEY C. RONES.
By Christian R. Nielsen
Attorney

UNITED STATES PATENT OFFICE 2,399,706

MANUFACTURE OF LENSES FOR EYEGLASSES

Harvey C. Rones, Astoria, Oreg.

Application December 9, 1943, Serial No. 513,589

1 Claim. (Cl. 51—284)

The invention relates to the structural features of bi-focal and tri-focal lenses and the like, and to the procedure in manufacture of such lenses where peculiar boundaries are involved on the elements of "buttons" embodied in such lenses, and particularly where such boundaries are of angular form, although the method is also applicable to curvilinear boundaries.

As is generally appreciated, the near vision element in bifocal lenses of this kind is principally used in reading, and books, drawings, and other sheets, newspapers and the like, are ordinarily of rectilinear form, with vertical columns of reading matter. In practice, when persons are reading, many endeavor to arrange the plane of the printed page or sheet so that the axis of vision is normal to such plane, but in the majority of cases, it is not practicable to so support the matter, and it requires considerable effort in many cases that discourage the endeavor. In reading newspapers, particularly, it is necessary to incline the paper away from the reader at the top, in order to hold it in extended position, and consequently, the actual form of the page, in any plane at right angles to a mean or medial line of sight to said page will be far from rectilinear, but on the contrary, due to perspective, the upper portions of the page or sheet will be apparently much narrower than the lower part. Consequently, a lens of adequate size and shape to enable a reader to such reading matter in such normal change of positions may be in the form of a truncated cone, the sides of which reasonably approximates the form of a sheet when viewed in perspective at the angles customary, as above indicated.

It is therefore an important aim of my invention to take advantage of this possibility in the structural form of the near vision element of a bifocal or trifocal lens, so that a larger area will be available in the remainder of the lens for more distant vision.

At the same time, it is an important aim of my invention to enable the formation of a near vision element as last mentioned, but at the same time, to incorporate such form in the near vision element that the same lens will be useful for ordinary near vision of objects other than reading matter, as for instance, articles upon a desk or table, or work-bench. Particularly, it is an aim also to incorporate in the saame element a structural form which will enable the lens to be readily utilized for reading rectangular sheets, and at the same time to enable clear vision of nearly objects adjacent the sheet without requiring extensive or objectionable peculiar movements of the head in order to bring the near vision element of the lens to line of sight.

It is an especially important aim of this invention to evolve a ready and economical method of producing button elements with the peculiar angles involved, as mentioned in the objects above set forth, particularly where an element or segment has a boundary corresponding to that of a truncated triangle.

It is an important object of the invention also to present a novel method of manufacture of button elements in quantity, which will materially reduce the cost of bifocal lenses. A most important aim of the invention is to enable the quantity production of button elements of angular form in which two or more matched elements are incorporated in the buttons, and whereby greatly increased accuracy in the production and fitting of such elements together may be attained with a minimum of waste, and with a minimum of complication in the steps of manufacture.

It is an important attainment of the invention that button elements produced in accordance with my invention may be incorporated in major lens elements by conventional steps of production heretofore well known, so that in the fusing of the elements no peculiar complications or special apparatus or procedure are required.

Additional objects, advantages and features of invention reside in the construction, arrangement and combination of parts involved in the embodiment of the lens, as well as in the novel and new steps and sequence of steps in manufacture of the elements of such lenses, as will be more readily understood from the following description and accompanying drawings, wherein Figure 1 is a rear view of a person reading a newspaper at the breakfast table, and illustrating in dotted outlines the relation of my near-vision element to the form which the newspaper assumes in the picture plane, as well as indicating how the lens is adapted to enable the viewing of objects adjacent the newspaper, with minimum movement of the head.

Figure 2 is a diagrammatic view of a person reading a drawing or the like, laid flat on a table, or the like, while Figure 3 shows the approximate form of such drawing in a picture plane at right angles to the axis of vision of the person, as shown in Figure 2.

Figure 4 is a plan view of a near-vision element or segment for the bifocal lens button or the like.

Figure 5 is a similar view of a modification thereof.

Figure 6 is a similar view of a further modification of such near-vision element.

Figure 7 is a view of a completed button embodying the near-vision element of Figure 6.

Figure 8 illustrates the contour of another modification of the near vision element and a button completed therewith.

Figure 9 shows a still further modification.

Figure 10 illustrates a still further modification of the near-element form, and a button completed therewith.

Figure 11 is a diagrammatic view, showing a pair of spectacles incorporating my lens, with a representation of the point of sight of a wearer, and illustrating the lines of sight involved in observing near and distant objects through the lenses shown in this view, illustrating how movements of the head are minimized, in order to gaze at nearby or distant objects.

Figure 12 is a top view of a block of button fragments arranged for finishing of the boundaries.

Figure 13 is a similar view of a block of matching segments similarly arranged.

Figure 14 illustrates one method of finishing the two sets of fragments for mutual matching and fit.

Figure 15 illustrates in side elevation a holder for a block of segments to be machine finished.

Figure 16 is an edge view of a grinding wheel which may be used for finishing one set of segments in one of the forms illustrated.

Figure 17 is a sectional view of a combined segment.

Figure 18 is a similar view showing the segment ground to form the button.

Figure 19 is a sectional view illustrating the lens fused to the major portion of a lens.

Figure 20 is a sectional view illustrating the finished lens.

Referring to the drawings, there is illustrated a lens comprising a major lens body 30, of conventional form and refraction index, in which there is embodied a unitary near-vision element 31 of a higher index of refraction. This segment 31 is of peculiar contour in the plan of the lens, as indicated in Figure 11. It consists of a lower major part 32, which, in Figure 7, has been formed with a semi-circular lower edge, so that the lower body of the piece is substantially semi-circular, although as indicated in Figures 5 and 8, it may be otherwise formed at its lower edge, if desired. The upper portion 33 of the near-vision segment as heretofore formed, extends over one-half of the width of the segment, and being arranged symmetrically upon the major part 32, and the latter projects at each side with horizontal upper edges or shoulders as at 34, to an intersection with the curved lower edge of the lower part of the segment.

As shown in Figure 11, the elevated upper part 33 of the near vision segment has an arcuate upper edge, so that it is nearly semi-circular in form, the ends of the arcuate edge portion resting upon or forming a junction with the horizontal top edge portions 34, and forming base angles at 35. In Figure 4, a near vision segment 31' is illustrated, having the same shape in its lower part as the segment 31, but the elevated central portion 33' being in the form of a truncated triangle, the base of which rests on a line coincident with the shoulders 34', which are the same as the shoulders 34, before described, the lower portion 32' of this segment being approximately of the same shape and size as the lower portion 32 of the segment 31, first described. The sides 36 of the elevated portion 33' are rectilinear and inclined toward each other at a similar angle to the horizontal shoulders 34' of the segment 31, first described. The inclination has a definite relation to an average of the angular relation of parallel lines defining the lateral boundaries of rectilinear planiform objects when viewed as is the case with newspapers held in the hands, or laid upon a table, or in the case of drawings viewed while lying upon a table or the like. It will be appreciated that small rectangular forms may be readily supported before the eyes of the observer without material distortion due to perspective, and such small objects may be viewed through the truncated triangular portion 33' and the adjacent lower portion 31'. However, when large sheets are to be viewed, it is usual for them to be laid flat upon a table or the like, where perspective causes the lateral boundaries to converge toward the more distant parts, substantially as indicated in Figures 1 and 3. The specific shapes and proportions illustrated are approximate, only, and may be varied as experience and practice dictate. The top edge 37 of the near-vision segment is horizontal, that is, parallel to the line on which the shoulders 34 lie.

In Figure 5 there is shown a modification of the boundary form of the near vision segment, in which the bottom of the lower portion is flat instead of being round, but at each end the bottom edge and side edges have a rounded junction at 38, the segment being otherwise of the same size and form as in Figure 4.

In Figure 8, the upper portion of the segment 31" is shown as having concave curved sides above the major lower portion, which merge with the top portions 34" of the bottom section 31", the lower portion of this curve, corresponding to the shoulders 34 before described, and the intermediate upper portion corresponding to the inclined sides 36; the top edge 37' being approximately the same width as the top edge 37 of the portions 33' of Figure 4.

For special personal requirements, which may include special vocational requirements, other forms of the upper portion of the near vision segment may be employed, all, however, maintaining a generally truncated triangular relation, taking into consideration the width of the lower portion corresponding to the part 31, and the upper part corresponding to the portion 33. Thus, in Figure 9, the upper portion 33—a is of generally rectangular form, the top edge approximating the width of the top edge at 37, while the sides of this portion 33—a are vertical and parallel, the lower semi-circular portion 31—a in this instance being shown as somewhat narrower than the portion 31' of Figure 4, so that shoulders 34—a are afforded, which are of the same width as the shoulders 34'. However, if desired, the lower portion 31—a may be of the same size as the lower portion 31' before described, in which event, the shoulder portions corresponding to those 34—a would be much wider; or if desired, the whole segment including the lower portion 31—a and the upper portion 33—a may be broadened.

In Figure 10, the near vision segment is shown with an upper frusto-triangular portion 33—b, and the lower semi-circular portion 31—b is of the same width as the base of the portion 33—b, the sides of which are inclined as in the upper part of the segment of Figure 4. In this instance, if the frusto-triangular portion is of the same size as that in Figure 4, the whole segment will be much smaller, but if desired, may be broadened to give a wider range to near vision, as will be appreciated.

*Manufacture*

In the introduction of the near vision segments into a lens for a bifocal lens, it is my practice to first form the major lens portion, and in the convex side thereof to form a surfaced counter-sink in accordance with conventional practice, and then introduce the button which is fitted to the counter-sink and fused with the major lens portion, in accordance with conventional practice, the near vision segment of the button being formed of glass with a different index of refraction than the glass used in the major portion of the lens, as will be understood. Thus, after one familiar practice, I form my near vision segment with the desired contours and having a semi-circular lower portion, as when using the necessary glass usually of a high coefficient of refraction, and then I form a top segment 41 with a lower edge portion suitably recessed to fit the top edge portion of the near vision segment. These two are then fused together (Fig. 17) and the combined segment then ground to form a button (Fig. 18) with one face adapted to fit the countersink in the major portion of the lens. The button thus formed and ground is then set in the countersink (Fig. 19) and fused with the major portion of the lens, after which the lens and the button portion thereon are ground to the desired finished surface (Fig. 20).

By forming the top segment of a button of glass of the same index of refraction as the glass in the major portion of the lens, this top segment merges and disappears in the major portion of the lens when finished, while the lower segment of the button remains effective as required, the optical formulas followed in the forming of the countersink and button, and the grinding of the finished lens being of course adapted to the particular case of the person who is to wear the glasses in which the invention is embodied.

In case the lower edge portion of the near vision segment in the button is to have a lower edge that is not circular, the procedure in forming the button may be modified from that previously described, in order to produce the necessary form, following conventional practices applicable to this end.

On account of the angularities involved in the near vision segments, it is necessary in the production of the buttons to form the top segment of the button with great precision and to effect an exact fit of the two pieces of the button before the fusing thereof, and I have evolved a method of forming these segments economically, prior practices applicable to this work having involved extremely expensive steps and much labor.

In carrying out my method of production of the button segments, I mold a multiplicity of the segments of a given form, and also the top segments of corresponding form to fit thereon. A multiplicity of segments of one form are gathered face to face, in alinement and held in a suitable form, as for instance, at 40 in Figure 15, this holder 40 being of such form as to clamp the segments securely with their top portions exposed well above the holder. If desired, to effect rigidity and security in the holding of the segments with freedom from liability of fracture, suitable cement may be interposed between the segments, using a cement of a nature which may be readily softened or removed for separation of the pieces. With the segments clamped in the holder 40, the whole group may then be ground on the exposed upper edges by sliding a correspondingly formed abrasive device thereon longitudinally of the group, or by mounting the holder in a machine with a sliding carriage which will move the holder in an accurately rectilinear path beneath a grinder such as shown in Figure 16, having the transverse shape corresponding to that desired in the nearly finished segment, and grinding the segments as they pass under this wheel, by rotating the wheel at suitable speeds and the application of coolants and abrasives as may be found desirable. A group of top segments is similarly gathered in a holder, and ground so as to fit the lower segments, ground as first described, and if desired, a final grinding may be effected by applying a suitable abrasive to the matched surfaces of the two groups of segments which are to be joined, and then sliding the two groups of segments upon each other, to effect a mutual grinding of the opposed members to an accurate mutual fit by relative longitudinal reciprocatory movement. The whole grinding of the opposed surfaces may be effected entirely by the last mentioned step, and may be carried out by hand, or by machine, as will be readily understood.

After grinding of the parts to the nicety of fit above indicated, respective top and bottom segments are then fused together, as before indicated, preparatory to grinding of the button thus formed to the necessary curvature for using into the major blank or portion of the lens, such grinding and fusing thereof into the major blanks being capable of attainment by conventional methods.

If a suitable cement is used between the segments in each group in respective holders, it is possible to bring groups of matching segments together in proper opposed relation and to fuse the two groups simultaneously, after which the interposed cement will be suitably dissolved or weakened and the completed button blank thus formed separated from each other, preparatory to individual grinding.

While I have disclosed my invention with great particularity, it will nevertheless, be understood that this is purely exemplary, and that various changes in the construction, arrangement and combinations of parts and in the order of the steps, and the nature of the steps involved, together with the substitution of mechanical equivalents, and materials, may be made without departing from the spirit of the invention, except as may be more particularly set forth in the appended claim.

I claim:

The method of forming segments of lenses to be joined edge to edge consisting in forming a multiplicity of blanks of the general form of one segment, arranging and securing these rigidly face to face in alinement with edge portions to be joined exposed in a predetermined line, and then grinding all simultaneously by engaging a correspondingly shaped grinding member therewith, applying a suitable abrasive to the edges to be ground and moving the same longitudinally of the rigidly held group, the two group of segments of respective forms intended to be matched and joined together being secured together in rigid relation with the edges to be matched exposed in each group, bringing the two groups together in mutual engagement at the edges to be matched and then reciprocating the two groups longitudinally in sliding grinding engagement with each other.

HARVEY C. RONES.